United States Patent

Sakaguchi et al.

[11] 4,029,306
[45] June 14, 1977

[54] SHOCK ABSORBER FOR BUMPERS

[75] Inventors: Takumi Sakaguchi; Toshifumi Yamamoto, both of Gyoda, Japan

[73] Assignee: Showa Manufacturing Co., Ltd., Tokyo, Japan

[22] Filed: May 30, 1975

[21] Appl. No.: 582,224

[30] Foreign Application Priority Data

Dec. 26, 1974 Japan .............................. 50-148441

[52] U.S. Cl. .............................. 267/116; 267/64 R
[51] Int. Cl.² ............................................ F16F 5/00
[58] Field of Search ........... 293/70, 60, 84, DIG. 2, 293/1, 24, 73, 89; 267/116, 124, 139; 188/286, 297, 322, 288, 305, 316, 317, 320; 213/41, 43, 64 R, 223

[56] References Cited

UNITED STATES PATENTS

| 2,348,160 | 5/1944 | Thornhill | 188/317 X |
|---|---|---|---|
| 2,494,280 | 8/1961 | Daffin | 285/2 X |
| 2,790,659 | 4/1957 | Malone et al. | 188/205 |
| 2,878,045 | 3/1959 | Allinquant | 188/205 |
| 2,963,175 | 12/1960 | Thornhill | 213/223 |
| 3,412,870 | 11/1968 | Rollins | 188/317 X |
| 3,554,387 | 1/1971 | Thornhill | 213/223 |
| 3,736,645 | 6/1973 | Fannin et al. | 29/434 X |
| 3,797,615 | 3/1974 | Stembridge | 188/322 X |
| 3,799,589 | 3/1974 | Boelkins | 285/321 X |
| 3,804,443 | 4/1974 | Kamatsu | 267/116 X |
| 3,806,105 | 4/1974 | Konishi et al. | 267/116 |
| 3,820,772 | 6/1974 | Kerr et al. | 293/60 X |
| 3,853,311 | 12/1974 | Kreuzer et al. | 267/116 X |
| 3,944,198 | 3/1976 | Sakamoto | 293/70 X |

Primary Examiner—Stanley H. Tollberg
Assistant Examiner—Norman L. Stack, Jr.
Attorney, Agent, or Firm—A. W. Breiner

[57] ABSTRACT

A shock absorber for bumpers comprising an inner cylinder having means at the front end for fitting the shock absorber to a bumper and the base part being slidably engaged in an outer cylinder having means for fitting it to a car frame; a high pressure gas enclosed between a free piston fitted in the inner cylinder and the front end of the inner cylinder; oil contained between the free piston and the botton surface of the outer cylinder so that no air gap produced, a tubular column fitted at its base end to the botton surface of the outer cylinder and provided with a plurality of side-by-side damping force generating holes, the front end being flexible engaged to the base end of the inner cylinder, and a plate-shaped valve slidably fitted on the tubular column is, opposed to the base end surface of the inner cylinder.

Such shock absorber is assembled by fitting an O-ring to the base end of the tubular column and enclosing the high pressure gas so that the free piston may be pressed into contact with a stopper on the inside surface of the inner cylinder, fitting the tubular column to the base end of the inner cylinder, inserting said tubular column at the base end into a hole on the bottom surface of the outer cylinder from the inside of the outer cylinder, pouring the oil into the inner cylinder and outer cylinder while the above mentioned O-ring is in contact with the bottom surface of the outer cylinder so that no air gap may be produced and then pressing the inner cylinder to compress the high pressure gas so that the O-ring may be moved into a hole on the bottom surface of the outer cylinder to fix the tubular column to the outer cylinder and slightly separate the free piston from the stopper.

7 Claims, 4 Drawing Figures

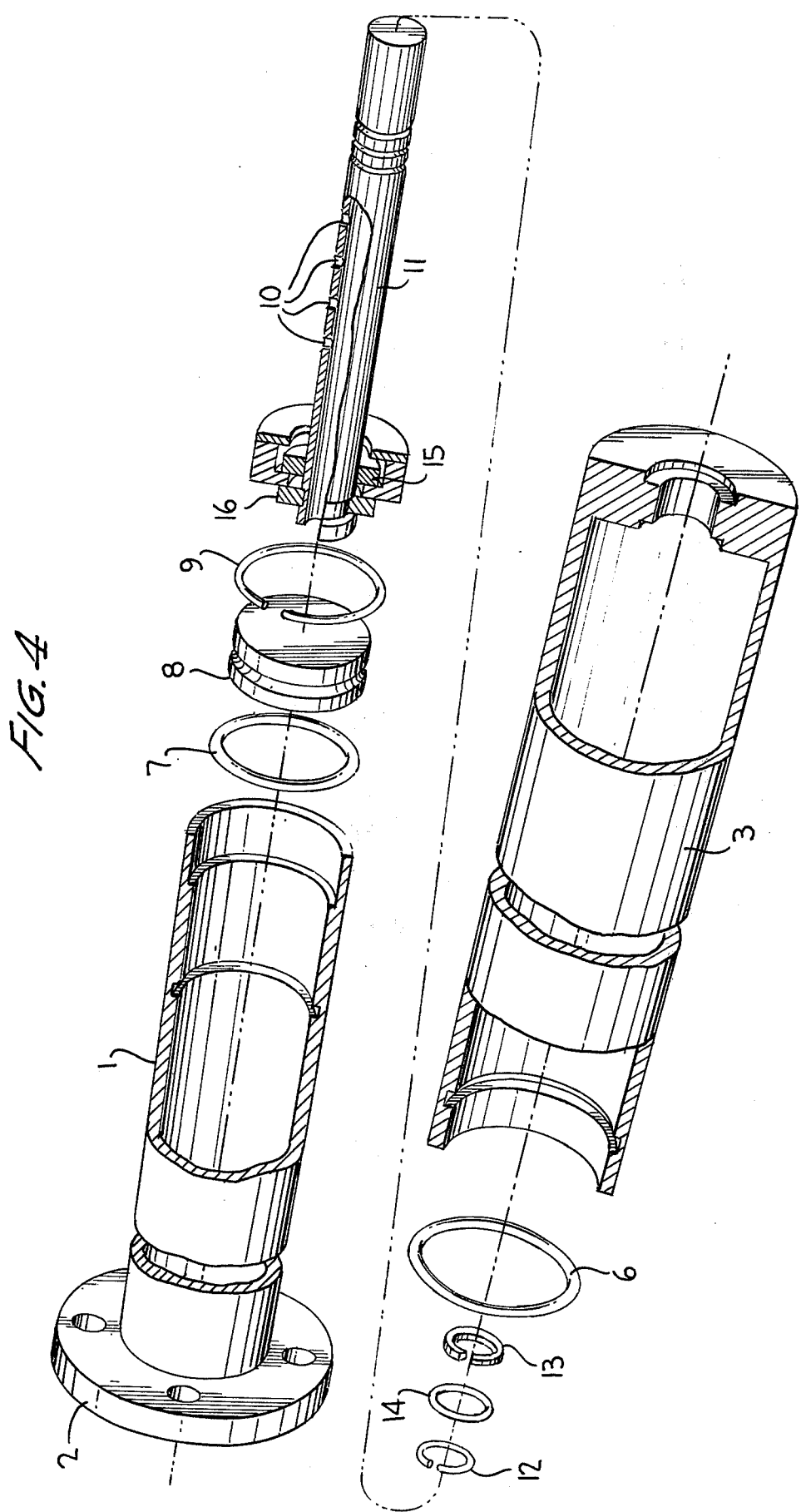

SHOCK ABSORBER FOR BUMPERS

This invention relates to oil pressure shock absorbers for bumpers to absorb shocks caused by collisions of automobiles or the like. Such bumper as described above, conventionally held by metal springs and/or oil pressure shock absorbers, has been complicated in structure and has not been easy to fit. Further, the absorption of shock energy decreases so quickly with the movement of the bumper that a large moving distance to make the absorbed energy constant is required which is undesirable.

An object of the present invention is to provide a shock absorber for bumpers which has a compact and simple structure and which is easy to assemble and fit, and to a method of assembling the same.

FIG. 4 is an exploded view of the structure shown in FIGS. 1 and 2.

Figure 1:
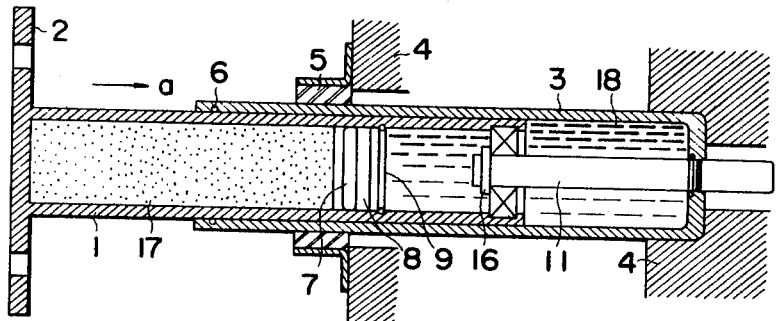
FIG. 1 is a vertically sectioned view of a shock absorber embodying the present invention.

In the drawings, a bumper is to be fitted to a bracket 2 at the front end of an inner cylinder 1. An outer cylinder 3 in which this inner cylinder is slidably fitted is fixed at the base end to a car body 4 and is fitted at the front end to the body through a rubber cylinder 5. An O-ring 6 in sliding contact with the inner cylinder is provided at the front end of the outer cylinder 3. A free piston 8 having an O-ring 7 is fitted in the inner cylinder 1 and a snap ring is fitted in an annular groove on the inside surface so as to be a stopper 9 for the free piston. Further, a tubular column 11 provided with a plurality of damping force generating holes 10 on the side surface is fitted at the base end in a hole on the bottom surface of the outer cylinder 3 and is fixed with snap rings 12 and 13 and an O-ring 14 fitted on the tubular column is kept in contact with the inside surface of the above mentioned hole. The tubular column 11 is flexibly fitted to the base end of the inner cylinder 1. A plate-shaped valve 15 flexible contained in a valve chamber at the base end of the above mentioned inner cylinder is slidably fitted on the tubular column 11 and a stopper 16 fitted to the front end of said tubular column is pressed in contact with the inside surface at the base end of the inner cylinder.

In such device, a high pressure gas 17 is enclosed between the above mentioned free piston 8 and the front end of the inner cylinder and an oil 18 is contained between the free piston and the base end of the outer cylinder 3 so that no air gap may be produced.

Figure 2:
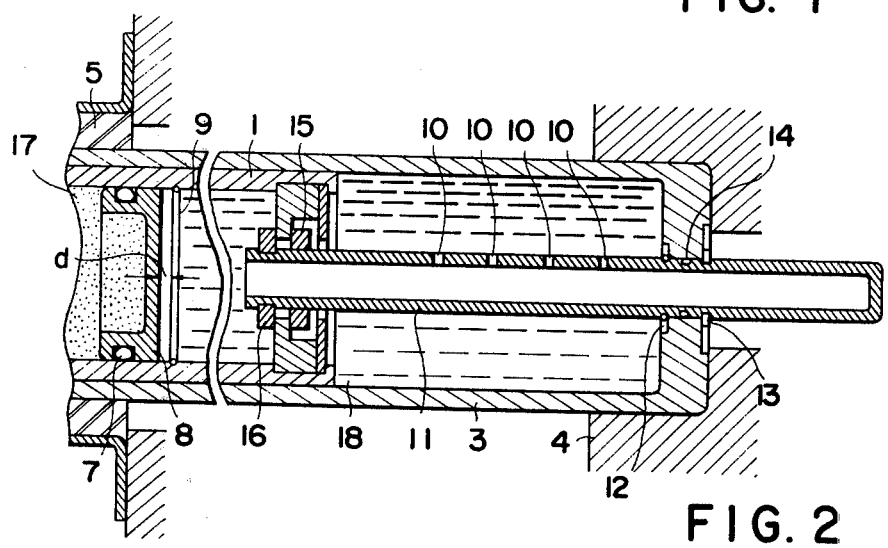
FIG. 2 is a magnified view of a part of FIG. 1.

In assembling the above described shock absorber, first of all, the high pressure gas 17 is fed into the inner cylinder 1, the free piston 8 is fitted, the gas 17 is compressed with this free piston and the stopper 9 being fitted so that the free piston 8 may be pressed in contact with the stopper 9 by the pressure of the above mentioned gas. After the high pressure gas 17 is thus enclosed, the plate-shaped valve 15 and tubular column 11 are fitted to the base end of the inner cylinder 1, O-ring 14 and snap ring 12 are fitted to the base end of said tubular column. Then the inner cylinder 1 is slidably fitted in the outer cylinder 3 and the oil 18 is poured through a hole on the bottom surface of the outer cylinder so as to fill the inner cylinder and outer cylinder. In this state, the inner cylinder 1 is pushed to insert the tubular column 11 into the hole on the bottom surface of the outer cylinder 3 from the inside of the outer cylinder so that the O-ring 14 may come into contact with the edge of the hole. The oil will be tightly enclosed in the outer cylinder and inner cylinder so that there may be no air gap. Therefore, when the inner cylinder 1 is further strongly pushed against the pressure of the high pressure gas 17, said gas will be compressed, the free piston 8 will separate by a slight distance $d$ from the stopper 9 as in FIG. 2. At the same time, the O-ring 14 will move into the hole on the bottom surface of the outer cylinder so as to be in contact with the inside surface of the hole and the snap ring 12 will come into contact with the edge of the hole. In this state, the snap ring 13 will snap on the tubular column 11 to fix said tubular column to the outer cylinder 3 so that the assembly may be completed. The shock absorber is fixed to the car body as in the drawing and the bumper is fitted to the bracket 2.

Figure 3:
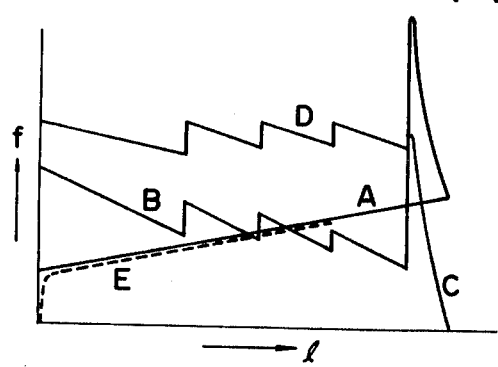
FIG. 3 is a diagram showing the characteristics of the shock absorber according to the present invention.

In FIG. 3 which is a diagram showing the characteristics of such shock absorber as is described above. The moving distance $l$ of the bumper at the time of a collison is taken on the abscissa and the damping force $f$ is taken on the ordinate. That is to say, when the bumper is moved by the collision shown by the arrow $a$ in FIG. 1, the high pressure gas 17 will be compressed and the reactive force applied to the bumper will increase as in the line A. Further, the oil 18 in the outer cylinder 3 will move into the inner cylinder through the holes 10 and therefore a damping force will be generated by the flow resistance. As the damping force is proportional to the square of the moving velocity of the bumper but said velocity gradually reduces, the damping force $f$ will gradually reduce together with the distance $l$. However, with the movement of the bumper, the holes 10 will move in turn into the inner cylinder 1 to reduce the passages of the oil so that the damping force may increase. Therefore, if the size of the holes 10 are properly designed, such damping force as in the line B will be generated and when the hole 10 nearest to the bottom surface of the outer cylinder 3 is closed by the plate-shaped valve 15, the oil will be tightly enclosed between the base end surface of the inner cylinder and the bottom surface of the outer cylinder to produce an oil locking action and therefore the damping force will quickly rise as shown by the pointed head part C. That is to say, such reactive force as in line D given by the sum of the lines A, B and C will be applied to the bumper and the energy will be absorbed substantially uniformly during the movement of the bumper. Therefore, if the amount of the absorbed energy is made constant, the moving distance of the bumper will be able to be made so small that the holding part will be able to be made small. Further, when the bumper moves to the extremity, a very large reactive force will be generated by the oil locking action and the bumper will stop without producing mechanical shocks.

When the free piston 8 is always pressed in contact with the stopper 9, the reactive force applied to the bumper by the pressure of the high pressure gas 17 will be represented by the broken line E in FIG. 3. That is to say, when the distance $l$ is zero, the force $f$ will be also zero and the bumper will be held while no force is applied. Therefore, when the volume of the oil 18 is reduced even slightly by the variation of the atmospheric temperature, the bumper will be able to rock and noises will be generated in running. However, when the shock absorber of the present invention is assembed as described above, the distance *d* will be given between the stopper 9 and free piston 8 and the above described difficulty will be able to be very easily removed.

As explained above, the bumper shock absorber of the present invention has a high performance characteristic of substantially uniformly absorbing the collision energy during the moving stroke of the bumper, can prevent mechanical shocks with the oil locking action, can be made simple and small in structure and can have a bumper fitted stably by a simple assembling method. Further, as the tubular column 11 is rockably fitted to the base end of the inner cylinder 1, even in case the axis of said tubular column does not coincide with the axis of the inner cylinder and outer cylinder, the shock absorber will operate smoothly.

What is claimed is:

1. A shock absorber for bumpers which comprises an inner cylinder including means at the closed front end thereof for fitting the shock absorber to a bumper, a fixed outer cylinder having a bottom surface and an open top into which the rear end of said inner cylinder is slidably engaged, a free piston slidably engaged in said inner cylinder, a high pressure fluid enclosed between said free piston and said closed front end of said inner cylinder, oil located between said bottom surface of said outer cylinder and said free piston in said inner cylinder, a tubular column engaged at the base end thereof to said bottom surface of said outer cylinder and flexibly engaged at the front end thereof to the rear end of said inner cylinder, a plurality of holes parallel to the axis of said tubular column and extending inwardly to an oil passage which leads to the area between the rear end of said inner cylinder and said free piston, and between the base end of said inner cylinder and the bottom surface of the outer cylinder to provide a damping force, and a plate-shaped valve slidably fitted on said tubular column and opposed to the rear end of said inner cylinder, said holes being substantially smaller than the cross-section of said tube wherein said liquid passes from said inner cylinder into said tubular column during compression.

2. A shock absorber according to claim 1 including a snap ring fitted in an annular groove on the inside surface of said inner cylinder between said free piston and the base end of said inner cylinder and adjacent to said free piston and projecting within said cylinder to fix said tubular column to said outer cylinder.

3. A shock absorber according to claim 1 including means whereby said outer cylinder can be fixed at the base end to a car body and means including a rubber cylinder for fitting the middle part of the outer cylinder to the car body.

4. A shock absorber according to claim 1 including snap rings for fitting said tubular column to the bottom surface of said outer cylinder and an O-ring positioned on said tubular column to engage said outer cylinder to form an oil-tight seal therebetween.

5. A shock absorber according to claim 1 wherein said tubular column is closed at its base end and open at the other end.

6. A method of assembling a shock absorber for bumpers comprising feeding a high pressure gas into an inner cylinder closed at its front end and thereafter fitting a free piston into said inner cylinder, positioning a stopper on the inside surface of the inner cylinder adjacent said free piston and toward the rear end of said inner cylinder, said gas pressing said free piston into contact with said stopper; fitting an O-ring toward the base end of a tubular column having a plurality of side-by-side holes and flexibly fitting the front end of said tubular column to the rear end of said inner cylinder, inserting said tubular column at its base end into a hole on the bottom surface of an outer cylinder from the inside of said outer cylinder, pouring oil through an oil hole into the area between said free piston and the bottom surface of said outer cylinder so that an air gap cannot be produced, and thereafter fixedly securing said tubular column toward its base end to the base end of the outer cylinder by positioning said O-ring on said tubular column in oil-tight engagement with said outer column.

7. The method of claim 6 wherein the inner cylinder is pressed so that said high pressure gas is further compressed and said free piston is slightly separated from said stopper.

* * * * *